(12) United States Patent
Dantzler et al.

(10) Patent No.: US 9,635,337 B1
(45) Date of Patent: Apr. 25, 2017

(54) DYNAMICALLY GENERATED MEDIA TRAILERS

(71) Applicant: Amazon Technologies, Inc., Seattle, WA (US)

(72) Inventors: James Lee Dantzler, Newcastle, WA (US); Bradley Gerald Pankop, Seattle, WA (US); David Anthony Campbell, Epsom Surrey (GB); Ha Chun, Seattle, WA (US); Lewis Anthony Hunt, Ashford Kent (GB)

(73) Assignee: Amazon Technologies, Inc., Seattle, WA (US)

( * ) Notice: Subject to any disclaimer, the term of this patent is extended or adjusted under 35 U.S.C. 154(b) by 48 days.

(21) Appl. No.: 14/670,813

(22) Filed: Mar. 27, 2015

(51) Int. Cl.
| | |
|---|---|
| H04N 9/80 | (2006.01) |
| H04N 9/87 | (2006.01) |
| G11B 27/031 | (2006.01) |
| G06F 17/30 | (2006.01) |

(52) U.S. Cl.
CPC .......... *H04N 9/87* (2013.01); *G06F 17/3082* (2013.01); *G06F 17/30828* (2013.01); *G11B 27/031* (2013.01)

(58) Field of Classification Search
CPC ............. G11B 27/002; H04N 21/4325; H04N 21/4312; H04N 21/4316; H04N 21/4825; H04N 5/45; H04N 5/77
See application file for complete search history.

(56) References Cited

U.S. PATENT DOCUMENTS

| | | | | |
|---|---|---|---|---|
| 8,132,103 | B1* | 3/2012 | Chowdhury | G06F 17/30056 715/720 |
| 9,002,175 | B1* | 4/2015 | Raj | H04N 5/76 386/241 |
| 2013/0343727 | A1* | 12/2013 | Rav-Acha | G11B 27/28 386/282 |
| 2015/0104154 | A1* | 4/2015 | Fu | G06F 17/30802 386/281 |

\* cited by examiner

*Primary Examiner* — Huy T Nguyen
(74) *Attorney, Agent, or Firm* — Thomas | Horstemeyer, LLP (57) ABSTRACT

Disclosed are various embodiments for dynamically generating media trailers for communication over a network. A request for a dynamically generated media trailer is received by a computing environment over the network. Clips are extracted from media files or previews associated with the media files according to media titles in lists and/or tags identified by a user. A customized media trailer is generated by coalescing the clips extracted from the media file or a preview associated with the media file according to a determined order. The media trailer is communicated to one or more client device over the network.

20 Claims, 8 Drawing Sheets

DYNAMICALLY GENERATED MEDIA TRAILERS

BACKGROUND

Typically, movie studios or other media production companies create movie trailers for distribution across different communication mediums in order to build anticipation and entice potential viewers into purchasing or renting a movie. These pre-generated movie trailers often include content not desirable for particular viewers, including clips of the movie referred to as "spoilers."

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to dynamically generating customized media trailers for communication over a network. As noted above, movie studios or other media production companies create movie trailers for distribution across different communication mediums in order to build anticipation and entice potential viewers into purchasing or renting a movie. These pre-generated movie trailers often include content not desirable for some viewers, including clips of the movie referred to as "spoilers." Customizing movie trailers for specific users remains problematic.

For example, a first user may be more interested in movies having action sequences while a second user may be more interested in movies having romantic sequences. A pre-generated movie trailer may be appealing to the first user while not being interesting to the second user. Moreover, some users do not want to see scenes that reveal plot components of a movie, referred to as spoilers. As a result, it may be desirable to create custom movie trailers for particular users based on user preferences.

According to various embodiments as will be described herein, a computing environment is employed to parse a media file to automatically generate tags for particular clips that occur during playback of the media file, where the tags for the clips are indicative of a type of scene or are suggestive of events that occur during the clips. For example, a scene of a movie, referred to herein as a clip, having gunshots and explosions may be tagged "action" and/or "violence." To tag particular sequences of a media file such as a movie, the computing environment may analyze the audio and/or video portions of the media file to detect events.

The tags for a sequence of a movie may also be crowd-sourced by users of various network sites. For example, users may submit their own tags for a particular sequence to describe events that occur during playback. In some embodiments, the tags automatically generated by the computing environment for a sequence may be verified using crowdsourcing.

In various embodiments, a trailer may be generated for one or more users based on media titles in a list, such as a list of movies recommended for the user, a watch list having movie titles specified by the user, or a list of promoted movie titles specified by a media streaming service. Using the media titles in one or more of the lists, the computing environment is employed to dynamically generate a trailer by combining various clips extracted from media files corresponding to the titles in the one or more lists. As a result, a media trailer may be generated to present a preview of the titles included in a list.

Further, a user desiring to view a customized trailer may use his or her client device, such as a personal computer, a tablet, or a smartphone, to create a customized request for a trailer of a particular media file or movie. In various embodiments, the request may comprise tags for which the user has previously shown interest. For example, if the user is interested in romantic aspects of the movie, the user may select a tag for "romance" or "love story." In various embodiments, a user history may be analyzed to determine user preferences. Using the tags or other preferences associated with the user, the computing environment is employed to generate a trailer by combining various clips extracted from the media file that are associated with the tags of interest to the user.

In the following discussion, a general description of a system for dynamically generating and communicating media trailers over a network and its components is provided, followed by a discussion of the operation of the same.

Figure 1A:
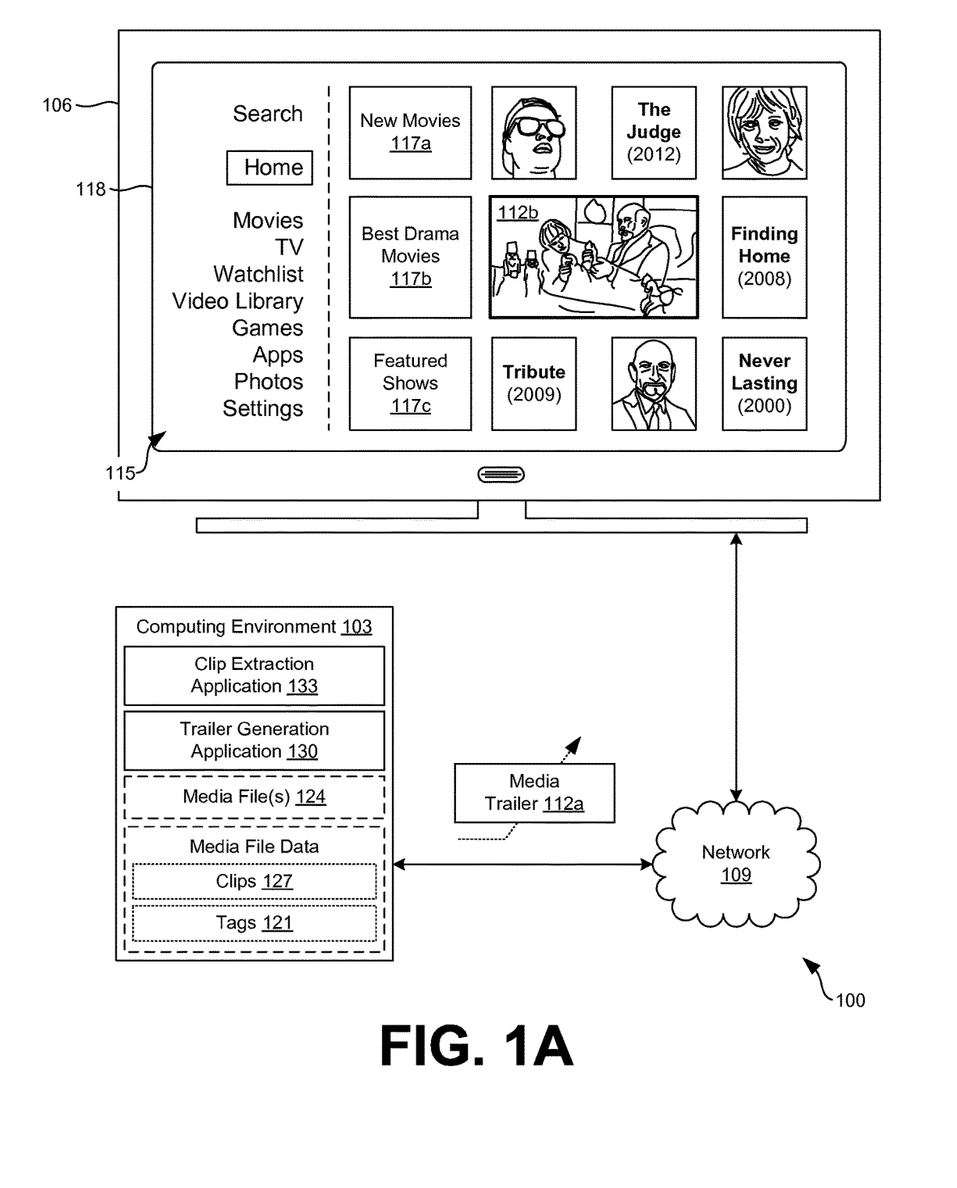
FIGS. 1A-1B are drawings of example user interfaces rendered by a client device in a networked environment according to various embodiments of the present disclosure.

With reference to FIG. 1A, shown is a networked environment 100 according to various embodiments of the present disclosure. The networked environment 100 includes a computing environment 103 and a client device 106, which are in data communication with each other via a network 109. The network 109 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

In the non-limiting example of FIG. 1A, the computing environment 103 is employed to dynamically generate a media trailer 112a . . . 112b for rendering on the client device 106. According to various embodiments, a user may interact with a user interface 115 rendered in a television (or other display device) to navigate through and select content to purchase, rent, download, stream, watch, or otherwise consume. For example, the user interface 115 facilitates a selection of particular movie or television titles from content made available to users by the computing environment 103. To select a particular movie title, the user may navigate lists 117a . . . 117c (collectively lists 117) in the user interface 115 using a remote control, video game controller, hand gesture, vocalized command, or other input device. In some embodiments, the lists 117 are generated for the user, for example, based on a watch history or a watch list of the user. In various embodiments, the lists 117 are generated by an administrator or by the computing environment 103, for example, to promote particular movie titles, television titles, or other content.

The media trailer 112 generated for display in the client device 106 may be generated based on a list 117 shown in the user interface 115. For example, the media trailer 112b may be generated using movie titles in the list 117b entitled "Best Drama Movies." Consequently, the media trailer 112b gives a user a glimpse of the titles included in the list 117b. In various embodiments, the media trailer 112b is generated based on a list 117 the user is currently navigating. For example, when the user navigates to the list 117b for "Best Drama Movies," the media trailer 112b may be generated and/or communicated to the device for rendering in a respective portion of the user interface 115. While playing, the media trailer 112b may show clips 127 extracted from each of the titles in the list 117b.

In the embodiment of FIG. 1A, to generate the media trailer 112, the trailer generation application 130 coalesces clips 127 of one or more media files 124 designated in the lists 117 and extracted by a clip extraction application 133 based on tags 121 associated with the clips 127. The clips 127 may be mined from the media files 124, such as a movie title, a television title, or from a movie trailer created by a studio or production company. Once the clips 127 are compiled into a combined media trailer 112, the combined media trailer 112 is communicated to the client device 106 over the network 109 for rendering in the display 118.

In various embodiments, the media trailer 112 may be selected by the user of the client device 106 to access the titles in the list 117 associated with the media trailer 112. For example, by selecting the media trailer 112b in the user interface 115, a subsequent user interface 115 may be generated having the titles in the list 117b for "Best Drama Movies." Further, the client device 106 may be employed to determine which clip 127 was playing when the user selected or otherwise manipulated the media trailer 112b. For example, if a user selected the media trailer 112b while a clip 127 for a movie entitled "Finding Home" was being shown, the subsequent user interface 115 generated by the client device 106 may navigate a portion of the list 117b where "Finding Home" is shown.

Figure 1B:
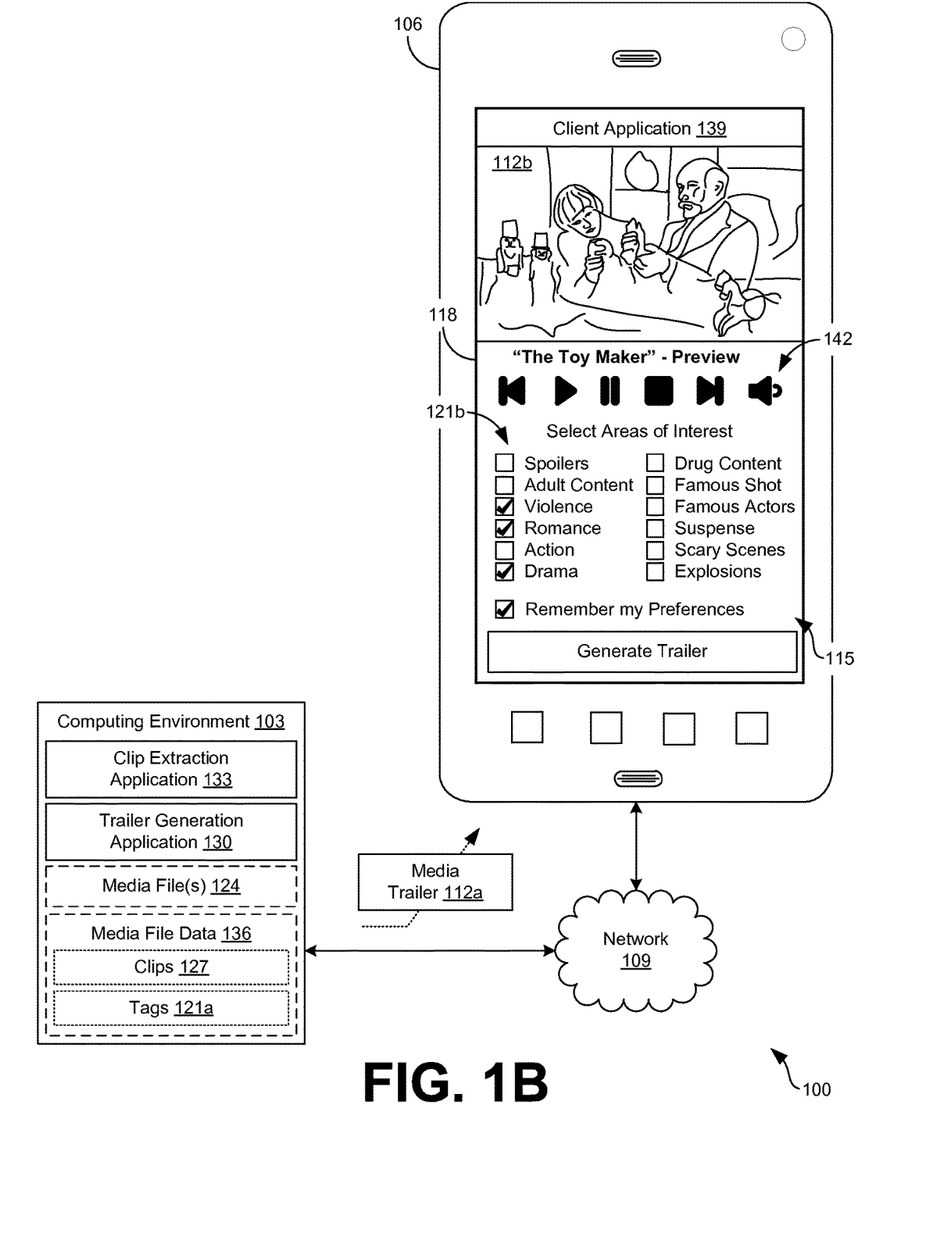

With reference to FIG. 1B, shown is a networked environment 100 according to various embodiments of the present disclosure. The networked environment 100 includes a computing environment 103 and a client device 106, which are in data communication with each other via a network 109. In the non-limiting example of FIG. 1, the computing environment 103 is employed to dynamically generate a media trailer 112a . . . 112b for rendering on the client device 106. To this end, a user of the client device 106 may interact with a user interface 115 in a display 118 of the client device 106 to select one or more tags 121a . . . 121b associated with a media file 124.

As may be appreciated, the tags 121 included in the user interface 115 are indicative of genres or particular areas of interest for users. The tags 121 selected by a user may be used to create a media trailer 112 customized for the user. For example, by selecting tags 121 labeled "violence," "romance," and "drama," clips 127 of the media file 124 associated with the tags 121 selected may cause a trailer generation application 130 to dynamically generate the media trailer 112 using one or more clips 127 of the movie being tagged with "violence," "romance," and "drama." The clips 127 of the movie may be extracted by the clip extraction application 133. The clips 127 may be mined from the media files 124, such as a movie file, or from a studio movie trailer. The clips 127 and the tags 121 may be stored as media file data 136 in a data store accessible to by components of the computing environment 103.

A client application 139 is executed on the client device 106 to generate the user interface 115 and to communicate the tags 121 selected by the user to the computing environment 103. Once received by the computing environment 103, the tags 121 may be accessed by the clip extraction application 133 and/or the trailer generation application 130. Further, in various embodiments, the client application 139 may facilitate playback of the media trailer 112 generated by the trailer generation application 130. For example, in response to a manipulation of playback components 142 of the user interface 115, the client application 139 may start playback of the media trailer 112, pause or stop playback of the media trailer 112, adjust a volume level of the client device 106 for playback of the media trailer 112, etc.

Figure 2:
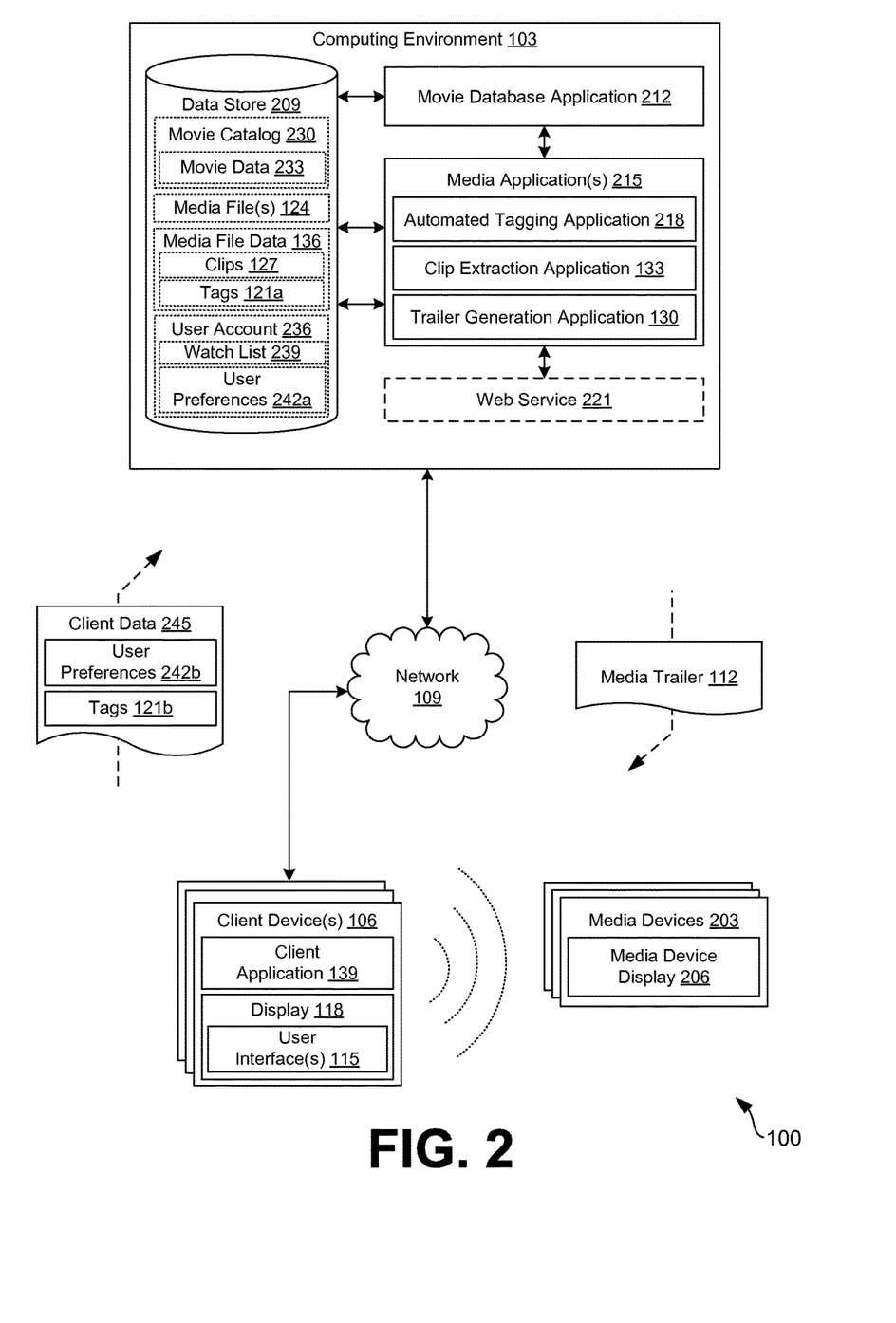
FIG. 2 is another drawing of the networked environment of FIG. 1 according to various embodiments of the present disclosure.

Moving on to FIG. 2, shown is another drawing of the networked environment 100 according to various embodiments of the present disclosure. The networked environment 100 of FIG. 2 includes a computing environment 103 and a client device 106, which are in data communication with each other via a network 109. In addition, the client device 106 may communicate with a media device 203 using Bluetooth®, ZigBee®, near-field communication (NFC), or other suitable communication medium to cause presentation of a media trailer 112 on a media device display 206.

The computing environment 103 may comprise, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 209 that is accessible to the computing environment 103. The data store 209 may be representative of a plurality of data stores 209 as can be appreciated. The data stored in the data store 209, for example, is associated with the operation of the various applications and/or functional entities described below.

The components executed on the computing environment 103, for example, include a movie database application 212, media applications 215, and other applications, services, processes, systems, engines, or functionality not discussed in detail herein. The media applications 215 include the trailer generation application 130 and the clip extraction application 133. In various embodiments, the media applications 215 include an automated tagging application 218.

The movie database application 212 is executed to generate user interface data such as web pages or other types of network content that are provided to client devices 106 for the purposes of viewing information associated with movies, television shows, or other similar content. The information includes production information, listings of actors, actresses, and characters, filming locations, etc. In various embodiments, the movie database application 212 also performs various backend functions in order to facilitate the online purchase of media content (e.g., movies, music, television shows).

The media applications 215 are employed to generate a media trailer 112. For example, the automated tagging application 218 is executed to parse a media file 124, such as a movie or television show, to generate tags 121 a for events occurring at various playback locations in the media file 124. For example, the automated tagging application 218 may identify speech segments to derive context about a scene and to generate a tag 121 with a label suggestive of the scene or indicative of the content of the scene. In various embodiments, the automated tagging application 218 may compare audio or speech segments from the media file 124 to digital fingerprints stored in memory. If a match is found, any tags 121 associated with the digital fingerprints are also associated with the analyzed audio or speech segment.

The clip extraction application 133 is executed to remove audio or video segments from the media file 124. As a non-limiting example, the clip extraction application 133 may remove one or two second segments from a media file 124 that may be used in generating a media trailer 112. The trailer generation application 130 is executed to generate a media trailer 112 customized for a particular user, list 117, or user account. To this end, the trailer generation application 130 may identify clips 127 having tags 121 of potential interest to a user and may coalesce the clips 127 into a single media trailer 112 for transmission to the client device 106. In various embodiments, the clip extraction application 133 extracts clips 127 from pseudorandom locations of the media file 124. Additionally, the length of the clips 127 extracted from the media file 124 may be determined pseudo-randomly.

The web service 221 is executed to provide a medium for communication between the computing environment 103 and/or the client devices 106 over the network 109. The web service 221 may comprise a web-based application programming interface (API) embodied in software that facilitates programmatic service calls (e.g., API calls) made by the client application 139 to communicate with the movie database application 212, the media application 215, and/or other services or applications not described herein. According to various embodiments, the web-based API may further comprise a representational state transfer (REST) API, a simple object access protocol (SOAP) API, or another suitable API.

The data stored in the data store 209 includes, for example, a movie catalog 230, media files 124, media file data 136, data associated with user accounts 336, and potentially other data. The movie catalog 230 includes movie data 233 which may comprise a listing of movies, television shows, music videos, or other similar content. The movie data 233 also includes information associated with such content, such as data associated with characters, scenes, plots, synopses, reviews, actors, actresses, writers, directors, production information, box office sales, etc. Further, the movie data 233 may include movie trailers or music files for a movie soundtrack. The movie data 233 may be parsed by the automated tagging application 218 to generate tags 121 for clips 127 or segments of a media file 124. In various embodiments, the media file data 136, as well as other data from the data store, may be accessed in a structured data format.

The media file 124 may include a single file or a collection of files corresponding to a movie, television show, music video, or other similar content. In various embodiments, the media file 124 is stored in one or more formats including, but not limited to, GIFV, SWF, MPEG, AVI, or QT. The data store 209 includes media file data 136 corresponding to each of the media files 124. The media file data 136 includes clips 127 removed from the media file 124 stored independently from the media file 124 as well as tags 121 associated with the clips 127 and/or the media files 124.

The data associated with the user account 236 includes a watch list 239 and one or more user preferences 242a. A watch list 239 comprises media content consumed, or desired to be consumed, by a particular user. In various embodiments, the watch list 239 is analyzed to identify tags 121 of potential interest of the user in order to facilitate generation of media trailers 112 customized for a particular user. Similarly, user preferences 242a are analyzed to identify tags 121 of potential interest of the user in order to facilitate generation of media trailers 112. The user preferences 242a may include tags 121 previously selected by users in generation of previously generated media trailers 112, or other similar data. Although the tags 121 are shown as being stored separately from the media trailer 112, in some embodiments, the tags 121 may be stored as metadata in the clips 127 and/or the media file 124.

The client device 106 is representative of a plurality of client devices that may be coupled to the network 109. The client device 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 106 may include the display 118. The display 118 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 106 may be configured to execute various applications such as the client application 139 and/or other applications. The client application 139 may be executed in a client device 106, for example, to access network content served up by the computing environment 103 and/or other servers, thereby rendering a user interface 115 on the display 118. To this end, the client application 139 may comprise, for example, a browser, a dedicated application, etc., and the user interface 115 may comprise a network page, an application screen, etc. The client device 106 may be configured to execute applications beyond the client application 139 such as, for example, email applications, social networking applications, word processors, spreadsheets, and/or other applications.

Next, a general description of the operation of the various components of the networked environment 100 is provided. To begin, it may be assumed that the media applications 215 are being employed to generate a media trailer 112 for a particular user or user account. For example, a first user may be more interested in movies having action sequences. A media trailer 112 may be generated to provide clips 127 of a media file 124 being associated with tags 121 labeled "action" or similar tags 121 such as "adventure" or "combat."

The media trailer 112 may be generated having clips 127 from a single media file 124 (e.g., from a single movie) or may be generated having clips 127 from multiple media files 124 (e.g., from different movies). For example, a single media trailer 112 may be generated for a plurality of media files 124 in a watch list 239 for a user. In various embodiments, only the media files 124 in the watch list 239 that have not been watched or purchased by the user are used in generating a media trailer 112.

Initially, the computing environment 103 may be employed to parse one or more media files 124 to automatically generate tags 121 for particular clips 127 that occur during playback of the media files 124, where the tags 121 for the clips 127 are indicative of a type of scene or are suggestive of events that occur during the clips 127. For example, a scene of a movie may have gunshots and explosions. The automated tagging application 218 is configured to recognize the gunshots and explosions and to tag the clip 127 with a tag 121 labeled "action" and/or "violence." To tag particular sequences of a media file 124, such as a movie, the automated tagging application 218 may analyze the audio and/or video portions of the media file to detect events.

In various embodiments, the tags 121 for a clip 127 may also be crowdsourced (or vetted) by users of various network sites, including a network site for the movie database application 212. For example, users may submit their own tags 121 for a particular clip 127 to describe events that occur during playback of the clip 127. The tags 121 submitted by a user may go through a vetting process to ensure accuracy. For example, if a number of tags 121 submitted for a particular clip 127 exceed a predefined number, the tags 121 may be associated with the clip 127. In some embodiments, the tags 121 generated by the automated tagging application 218 may be verified using crowdsourcing. For example, the movie database application 212 may prompt the users to verify that the tags 121 associated with a particular clip 127 are accurate or suggestive of events that occur during the clip 127. This may be accomplished using a voting component, such as a downvote and/or an upvote component.

Next, in various embodiments, a media trailer 112 may be generated for one or more users based on media titles in a list 117 (FIG. 1A), such as the watch list 239 having movie titles specified by the user as being of particular interest. Using the media titles in the watch list 239, the trailer generation application 130 is executed to generate the media trailer 112 by combining various clips 127 extracted from media files 124 corresponding to the titles in the watch list 239. As a result, the media trailer 112 generated is able to give a user a preview of the titles included in the watch list 239.

In some embodiments, a user desiring to view a customized media trailer 112 for a particular media file 124 may use his or her client device 106, such as a personal computer, a tablet, or a smartphone, to create a customized request for the media trailer 112. In various embodiments, the request may be submitted as client data 245 from the client device 106 to the computing environment 103. The client data 245 may include user preferences 242b and/or a selection of tags 121 specified as being of particular interest to the user. For example, if the user is interested in romantic aspects of a media file 124 or a plurality of media files 124 in a list, the user may select a tag 121b for "romance" or "love story" that may correspond to potential events identified in certain scenes. In various embodiments, a user history may be analyzed to determine user preferences 242b. Using the tags 121 or other preferences associated with the user, the trailer generating application 130 is employed to generate a trailer "on-the-fly" by combining various clips 127 extracted from the media file 124 that are associated with the tags 121 of interest to the user.

Further, the tags 121 specified by the user may be compared to tags 121 of media files 124 in various lists to generate a media trailer 112 that recommends various media titles. For example, if the user has selected the tag 121 for "action," movie titles in a list of titles recommended for the user may be searched to see if any of the movie titles in the list also have the tag 121 labeled "action." If so, one or more clips 127 may be extracted from the one or more media files 124 and used in generating a media trailer 112.

In addition to or in place of tags 121 included in the client data 245, other tags 121 may be identified based on user history. In various embodiments, a consumption history associated with a user account may be analyzed by the trailer generation application 130 to identify tags 121 that may be of particular interest to a user. The consumption history may include movies, television shows, music videos, music files, or other media content previously watched or listened to by the user as well as items consumed (e.g., purchased, leased, or rented) by the user through an electronic commerce system. Further, in some embodiments, a web navigation history, web cookie history, previously generated media trailers 112, or other data may be used to identify tags 121 that may be of particular interest to a user. As a non-limiting example, if a user has watched or purchased a notable amount of resonance movies, the tag 121 labeled "romance" may be identified based on a history for the user.

The trailer generation application 130 accesses clips 127 of the media file 124 from the data store 209 that are associated with the tags 121 identified for the user. For example, if tags 121 were selected by the user having the labels "romance" and "comedy," clips 127 associated with these tags 121 may be identified and accessed from the data store 209. In some embodiments, the clip extraction application 133 is employed to generate clips 127 for the tags 121. To this end, the clips 127 may be extracted from either a preview for the media file 124 (e.g., a movie trailer) or from the media file 124 itself.

Further, in various embodiments, the trailer generation application 130 may determine an order of the clips 127 for the media trailer 112. In one embodiment, an order of the clips 127 is pseudo-randomly generated by the trailer generation application 130. In an alternative embodiment, one or more predefined trailer templates may be employed to create a media trailer 112 having production-like quality. As a non-limiting example, a predefined trailer template may include rules for creating a media trailer 112 having a beginning segment, a middle segment, and an end segment. Each of the segments of the media trailer 112 includes one or more clips 127 of the media file 124. The beginning segment may comprise clips 127 selected to introduce characters, actors, and/or a setting. A middle segment may comprise clips 127 selected to show turmoil or obstacles that the characters must overcome. Finally, the end segment may comprise clips 127 selected that describe conflicts or create tension, excitement, and/or humor. The clips 127 determined for each of the segments may be determined based at least in part on their tags 121. For example, a tag 121 for a clip labeled "Jane Smith" may be indicative of a scene with the character "Jane Smith." This clip 127 may be used in the beginning segment to introduce a character according to a predefined trailer template.

In another example, a predefined trailer template may include rules for creating a media trailer 112 having an introductory segment, an "outro" segment, and other content between the introductory segment and the outro segment. The introductory segment may include clips 127 selected to introduce a setting or tagged with "introductory," or a similar suitable tag 121. The outro segment may include clips 127 selected to introduce to create suspense or create a "cliffhanger." The clips 127 used in between the introductory segment and the outro segment may be selected at random or may be selected to introduce characters and/or actors that appear in the media file 124.

The trailer generation application 130 is then executed to generate the media trailer 112 according to the determined order. In various embodiments, the media trailer 112 is generated by coalescing independent files of the clips 127 into a single file for the media trailer 112. As may be appreciated, if necessary, the trailer generation application 130 may utilize a codec or other similar application to decode the clips 127 and/or encode the coalesced clips 127 into a single file for the media trailer 112. Additionally, one or more coding or compression formats may be employed based on a desired file type, file size, or other desired constraint to facilitate streaming or communication of the media trailer 112 over the network 109.

In various embodiments, the trailer generation application 130 may overlay the media trailer 112 with music or computer-generated speech. In various embodiments, the music may be selected from a soundtrack of the media file 124 and accessed as movie data 233 from the data store 209. Any audio (e.g., speech, explosions, or other noises) associated with the clips 127 may be muted or removed and music from the soundtrack may be used as the only audio component. In other embodiments, the music is applied at a volume level lower than a volume level of the audio of the clips 127. As a result, any character dialog or sound effects will be more apparent than the music. However, in other embodiments, the music may be applied at a volume level higher than a volume level of the audio of the clips 127.

According to various embodiments, the clips 127 may be combined using one or more video effects such as fade-ins, fade-outs, split screens, rotations, delays, fast motion, slow motion, or other effects. With respect to split screens, a first clip 127a may be shown in one window while a second clip 127b may be shown in another window. Additionally, all or a portion of the media trailer 112 may be generated using visual filters such as color balancing, black and white, sepia, chromium, etc. The media trailer 112 generated by the trailer generation application 130, comprising the clips 127 arranged in the determined order, is communicated to the client device 106 over the network 109. In various embodiments, the media trailer 112 is streamed to the client device 106. In other embodiments, the media trailer 112 is communicated to the client device 106 in one or more files for rendering by the client application 139 or other application.

Figure 3A:
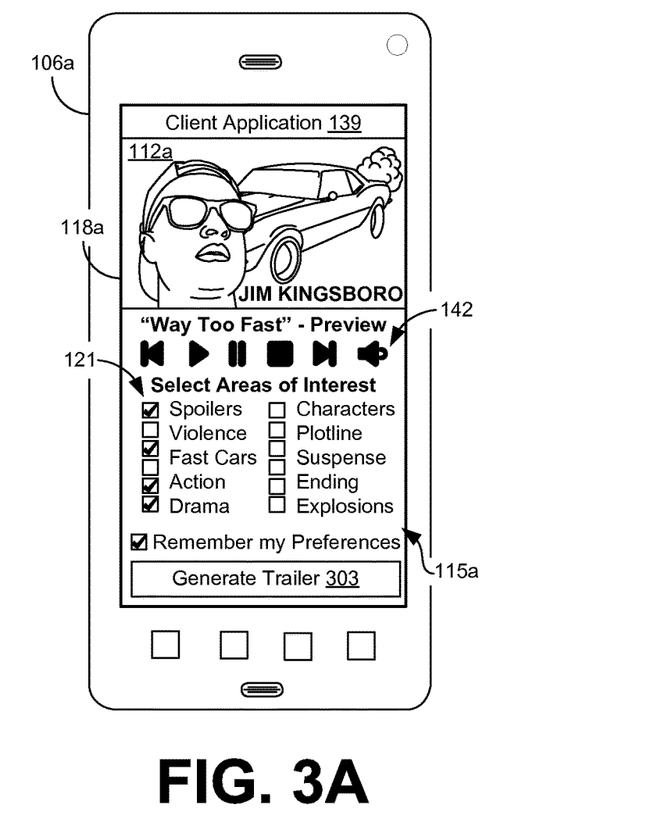
FIGS. 3A-3B are drawings of example user interfaces rendered by the client device in the networked environment of FIG. 1 according to various embodiments of the present disclosure.

Referring next to FIG. 3A, shown is a drawing of an example user interface 115a rendered by the client device 106a according to various embodiments of the present disclosure. In the non-limiting example of FIG. 3A, the application 139 is executed on the client device 106a to facilitate customization of a media trailer 112a for the user. The user of the client device 106 may interact with the user interface 115a in the display 118a of the client device 106 to select one or more tags 121a . . . 121b associated with a media file 124 (FIGS. 1A-1B). As may be appreciated, the tags 121 included in the user interface 115a are indicative of genres or particular areas of interest for users. In some embodiments, the tags 121 included in the user interface 115a are determined according to the media file 124 such that users cannot select tags 121 that are not related to the particular media file 124.

The tags 121 selected by a user may be used to create a media trailer 112 customized for the user. For example, by selecting tags 121 labeled "spoilers," "fast cars," "action," and "drama," clips 127 (FIGS. 1A-1B) of the media file 124 associated with the tags 121 selected may cause the trailer generation application 130 (FIGS. 1A-1B) to dynamically generate the media trailer 112a using one or more clips 127 of the movie being tagged with "violence," "romance," and "drama." As noted above, the clips 127 of the movie may be extracted by the clip extraction application 133 (FIGS. 1A-1B).

The client application 139 is configured to communicate the tags 121 selected by the user to the computing environment 103 (FIGS. 1A-1B) as they are made or in response to a manipulation of a generated trailer component 303. Once received by the computing environment 103, the tags 121 may be accessed by the clip extraction application 133 and/or the trailer generation application 130. Further, in various embodiments, the client application 139 may facilitate playback of the media trailer 112 generated by the trailer generation application 130. For example, in response to a manipulation of playback components 142 of the user interface 115, the client application 139 may start playback of the media trailer 112, pause or stop playback of the media trailer 112, adjust a volume level of the client device 106 for playback of the media trailer 112, etc.

Figure 3B:
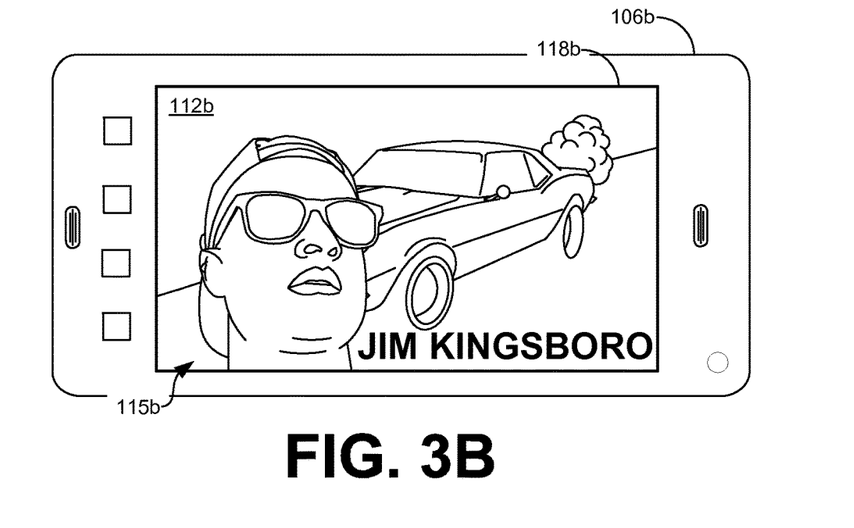

Turning now to FIG. 3B, shown is another drawing of an example user interface 115b rendered by the client device 106b according to various embodiments of the present disclosure. In the non-limiting example of FIG. 3B, the media trailer 112b may be viewed by a user in a full-screen mode where the media trailer 112b consumes all of the display 118b. However, by interacting with the user interface 115b (e.g., by pressing on the display 118b), the client application 139 may present playback components 142 or may revert the user interface 115b to the user interface 115a of FIG. 3A.

In various embodiments, user interfaces 115 that display a media trailer 112 may be configured such that a manipulation of the media trailer 112 (e.g., tapping on the display or pressing a button on a remote control) may cause one or more user interfaces 115 to be presented that facilitate a purchase and/or a playback of the media file 124. In embodiments where a media trailer 112 comprises clips 127 from a plurality of media files 124, a manipulation of the media trailer 112 while a particular clip 127 is being shown in the display 118 causes a user interface 272 to be presented comprising information associated with the corresponding media file 124.

Figure 4:
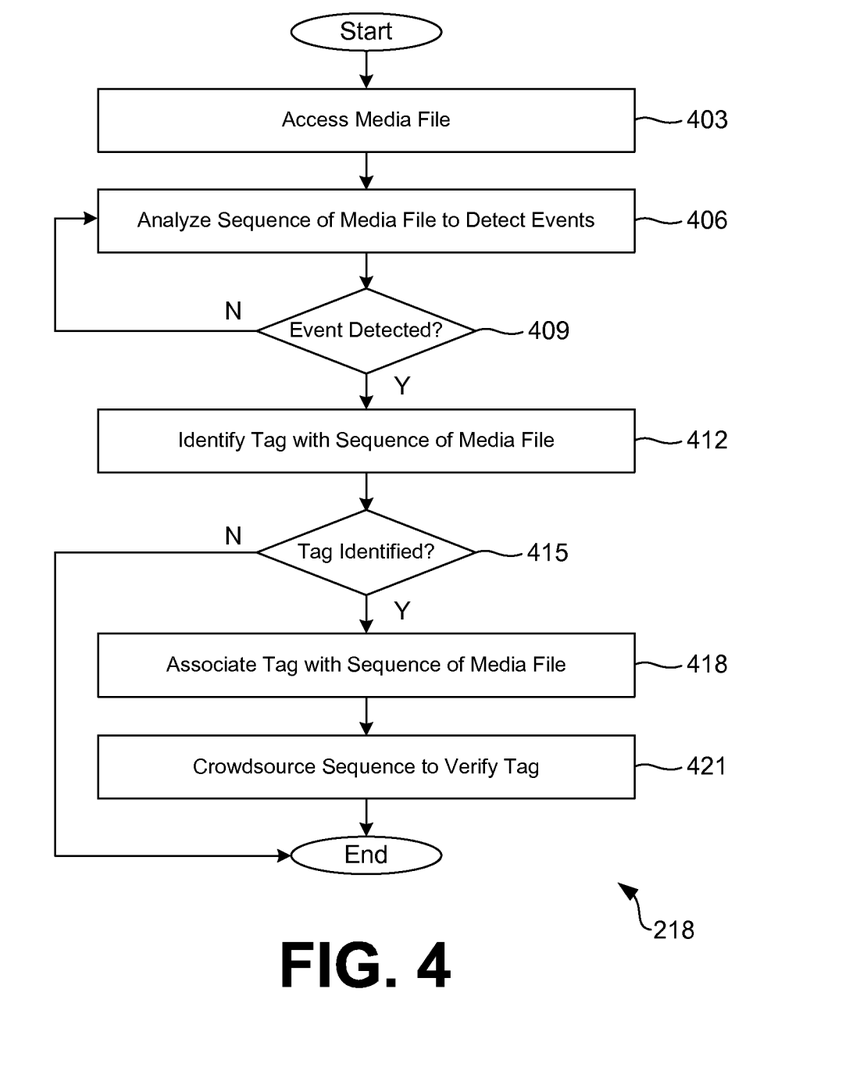
FIG. 4 is a flowchart illustrating one example of functionality implemented as portions of an automated tagging application executable in a computing environment in the networked environment of FIG. 1 according to various embodiments of the present disclosure.

Referring next to FIG. 4, shown is a flowchart that provides one example of the operation of a portion of the automated tagging application 218 according to various embodiments. It is understood that the flowchart of FIG. 4 provides merely an example of the many different types of functional arrangements that may be employed to implement the operation of the portion of the automated tagging application 218 as described herein. As an alternative, the flowchart of FIG. 4 may be viewed as depicting an example of elements of a method implemented in the computing environment 103 (FIGS. 1A-1B) according to one or more embodiments.

Beginning with 403, the automated tagging application 218 access a media file 124. As noted above, the media file 124 may comprise a video file (e.g., GIFV, SWF, MPEG, AVI, or QT), an audio file (e.g., MP3, WAV, DSS), or another similar file. In various embodiments, the media file 124 may be accessed from the data store 209 (FIG. 2) or, in alternative embodiments, the media file 124 may be accessed from an external network site or service.

Next, in 406, sequences of the media file 124 are analyzed to detect identifiable events. To tag particular sequences of a media file such as a movie, the automated tagging application 218 may analyze the audio and/or video component of the media file 124 to detect events. In various embodiments, identifiable events from the audio component include speech, loud noises (e.g., gunshots, explosions, or screeching of car tires indicative of an action scene), soundtrack music (e.g., classical music indicative of a romantic scene), sports-related noises (e.g., a football tackle, sneakers on a basketball floor, or a batter hitting a baseball indicative of a sports scene), etc. In various embodiments, to detect the events, the automated tagging application 218 may compare the audio segment from the sequence of the media file 124 to digital fingerprints stored in memory. If speech is identified, the speech may be converted to use using a speech-to-text application or service.

Identifiable events from the video component include scenes with particular actors or actresses, scene transitions, movements by the characters indicative of a type of sequence (e.g., a character holding a gun indicative of an action scene), etc. In various embodiments, to detect the events, the automated tagging application 218 may compare frames of the video component of the segment to digital fingerprints stored in memory.

In a non-limiting example, a frame of a sequence may be analyzed to identify the actor, actress, or character in the sequence as described in U.S. patent application Ser. No. 13/860,347, entitled "Detection of Cast Members in Video Content," filed on Apr. 10, 2014, which is incorporated by reference in its entirety herein. A name of the actor, actress, or character may be used as a tag 121 for the sequence.

In 409, it is determined whether an event has been detected. If no events are detected, the process reverts to 406 to continue analyzing subsequent sequences to detect events. However, if one or more events are detected, in 412, applicable tags 121 are identified from the data store 209 (FIG. 2) based on the event. To this end, each of the events may be associated with particular tags 121 stored in the data store 209. In 415, it is determined whether an applicable tag 121 has been identified based on the event. If no applicable tag 121 exists, the process may proceed to the end. However, if a tag 121 is identified that is associated with a particular event, then in 418 the tag is associated with the sequence. Assuming the sequence is extracted as a clip 127 (FIGS. 1A-1B), the extracted clip 127 may also be associated with the tags 121 to facilitate generation of media trailers 112.

In 421, the tags 121 generated by the automated tagging application 218 may be verified using crowdsourcing. For example, the movie database application 212 (FIG. 2) may prompt users of the application to verify that the tags 121 associated with a particular sequence or clip 127 are accurate and are suggestive of the events that occur during the clip 127. This may be accomplished using a a voting component (e.g., a downvote and/or an upvote component) for each of the tags 121.

Figure 5:
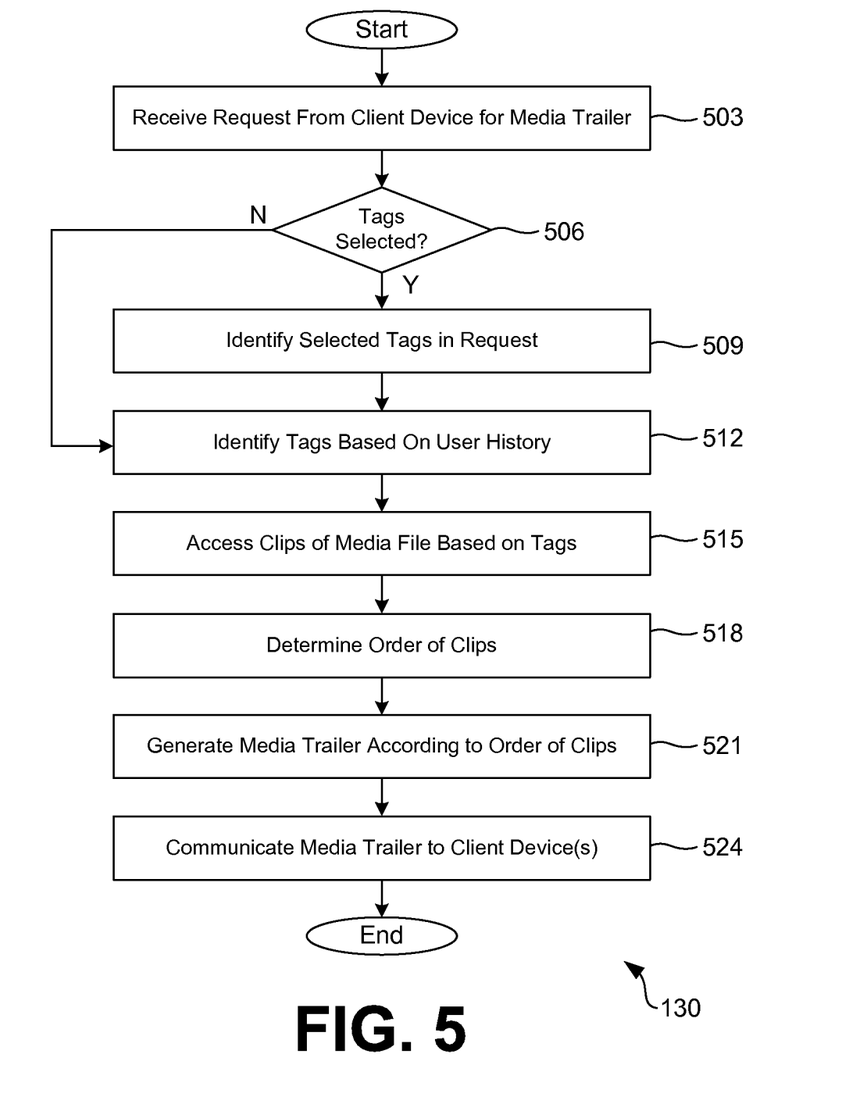
FIG. 5 is a flowchart illustrating one example of functionality implemented by a trailer generation application executable in a computing environment in the networked environment of FIG. 1 according to various embodiments of the present disclosure.

Referring next to FIG. 5, shown is a flowchart that provides one example of the operation of a portion of the trailer generation application 130 according to various embodiments. It is understood that the flowchart of FIG. 5 provides merely an example of the many different types of functional arrangements that may be employed to implement the operation of the portion of the trailer generation application 130 as described herein. As an alternative, the flowchart of FIG. 5 may be viewed as depicting an example of elements of a method implemented in the computing environment 103 (FIGS. 1A-1B) according to one or more embodiments.

As noted above, it is desirable to create custom movie trailers for particular users based on user preferences. To this end, the trailer generation application 130 is employed to generate a media trailer 112 "on-the-fly," or dynamically, in response to a request made by a user or a client device. For example, a user may download and execute the client application 139 of FIG. 1 to generate a media trailer 112 customized for his or her particular interests. Alternatively, a client device may indicate that a user has navigated to a portion of the user interface associated with a list of media titles (e.g., promoted movies, movies in a user's watch list 239 (FIG. 2), or other content). The client device 106, via the client application 139, may generate a media trailer 112 to recommend the titles in the list to the user.

Beginning with 503, the trailer generation application 130 receives a request to generate a media trailer 112 in association with a particular media file 124, or list of media files 124, from the client device 106 (FIGS. 1A-1B). The media trailer 112 is customized for the user based on a list, user input received via the client application 139, or other user preferences.

In various embodiments, the request may comprise a selection of tags 121 provided by the user, for example, via the user interface 115 of FIG. 1 or FIG. 3. In some embodiments, the user may select tags 121 labeled "spoilers," "violence," "action," "drama," or other tags 121. The tags 121 selected by the user may be indicative of sequences of interest for the user. For example, the user may be interested in seeing sequences of a movie associated with the tags 121 selected.

In some embodiments, the request for the media trailer 112 may not include tags 121 selected by the user. For example, the trailer generation application 130 may be employed to dynamically generate media trailers 112 for visitors of network sites in the form of advertisements, as opposed to users of the client application 139. As the user has not selected tags 121 for use in generating a media trailer 112, other information associated with the user may be employed. As a non-limiting example, a user may interact with a user interface 115 rendered in a television (or other display device) to select content to purchase, rent, download, stream, watch, or otherwise consume. The user interface 115 may facilitate a selection of particular media titles from lists 117 of content made available to users by the computing environment 103 or via a third-party streaming service. The client device 106, via the client application 139, may generate a media trailer 112 to recommend the titles in the list 117 to the user.

As noted above, in some embodiments, the request may or may not include tags 121 selected by the user. Accordingly, in 506, a determination is made whether the request for the media trailer 112 comprises tags 121 selected by the user. If no tags 121 are included in the request, the process proceeds to 512. However, if tags 121 are included in the request, the tags 121 selected by the user are identified in 509. Identifying the tags 121 may include parsing data included in the request and comparing the data included in the request to data in the data store 209.

In addition to or in place of tags 121 included in the request, in 512, other tags 121 may be identified based on user history. In various embodiments, a consumption history associated with a user account may be analyzed by the trailer generation application 130, or separate application, to find tags 121 that may be of particular interest to a user. The consumption history may include movies or other media content previously watched or listened to by the user as well as items consumed (e.g., purchased, leased, or rented) by the user through an electronic commerce system. Further, in some embodiments, a web navigation history, web cookie history, previously generated media trailers 112, or other data may be used to identify tags 121 that may be of particular interest to a user. As a non-limiting example, if a user has watched or purchased a notable amount of action movies, the tag 121 labeled "action" may be identified based on a history for the user.

Next, in 515, one or more clips 127 of the media file 124 are accessed based on the tags 121 identified in 509 and/or 512. For example, if tags 121 were selected by the user having the labels "romance" and "comedy," clips 127 associated with these tags 121 may be identified and accessed. In some embodiments, the clip extraction application 133 is employed to generate clips for the tags 121. To this end, the clips 127 may be extracted from either a preview for the media file 124 (e.g., a movie trailer) or from the media file 124 itself.

In 518, an order of the clips 127 for the media trailer 112 is determined. As may be appreciated, the order of the clips 127 corresponds to the order of sequences that will be shown to a user during a playback of the media trailer 112. In one embodiment, an order of the clips 127 is psuedorandomly generated by the trailer generation application 130. In an alternative embodiment, one or more predefined trailer templates may be employed to create a media trailer 112 having a production-like quality. As a non-limiting example, a predefined trailer template may include rules for creating a media trailer 112 having a beginning segment, a middle segment, and an end segment. Each of the segments of the media trailer 112 includes one or more clips 127 of the media file 124. The beginning segment may comprise clips 127 selected to introduce characters, actors, and/or a setting. A middle segment may comprise clips 127 selected to show turmoil or obstacles that the characters must overcome. Finally, the end segment may comprise clips 127 selected that describe a conflict or a resolution of conflict, or create tension, excitement, and/or humor. The clips 127 determined for each of the segments may be determined based at least in part on their tags 121. For example, a tag 121 for a clip 127 labeled "John Doe" may be indicative of a scene with the character "John Doe." This clip 127 may be used in the beginning segment to introduce a character according to a predefined trailer template. As a result, an order of the clips accessed in 515 is created.

Next, in 521, the media trailer 112 is generated according to the order determined in 518. In various embodiments, the media trailer 112 is generated by coalescing independent files of the clips 127 into a single file for the media trailer 112. As may be appreciated, if necessary, the trailer generation application 130 may utilize a codec or other similar applications to decode the clips 127 and/or encode the coalesced clips 127 into a single file. In addition, one or more coding or compression formats may be employed based on a desired file type, file size, or other desired constraint to facilitate streaming or communication of the media trailer 112 over the network.

In various embodiments, the trailer generation application 130 may overlay music or computer-generated speech. In various embodiments, the music may be selected from a soundtrack of the movie. Any audio (e.g., speech, explosions, or other noises) associated with the clips 127 may be muted or removed and music from the soundtrack may be used as the only audio component. In other embodiments, the music is applied at a volume level lower than a volume level of the audio of the clips 127. As a result, any character dialog or sound effects will be more apparent than the music. However, in other embodiments, the music may be applied at a volume level higher than a volume level of the audio of the clips 127.

In various embodiments, the music may be selected based on a similarity of a genre of music and a genre of the media file 124. For example, rock music may be selected for an action movie or classical music may be selected for a romance movie. In various embodiments, a music playlist associated with a user may be used to select music based on the genre of the music items in the playlist and the genre of the media file 124.

According to various embodiments, the clips 127 may be combined using one or more video effects such as fade-ins, fade-outs, split screens, rotations, delays, fast motion, slow motion, or other effects. Additionally, all or a portion of the media trailer 112 may be generated using visual filters such as color balancing, black and white, sepia, chromium, etc.

In 524, the media trailer 112, comprising the clips 127 arranged in the order determined in 518, is communicated to the client device 106. In various embodiments, the media trailer 112 is streamed to the client device 106. In other embodiments, the media trailer 112 is communicated to the client device 106 in one or more files for rendering by the client application 139 or other application.

Figure 6:
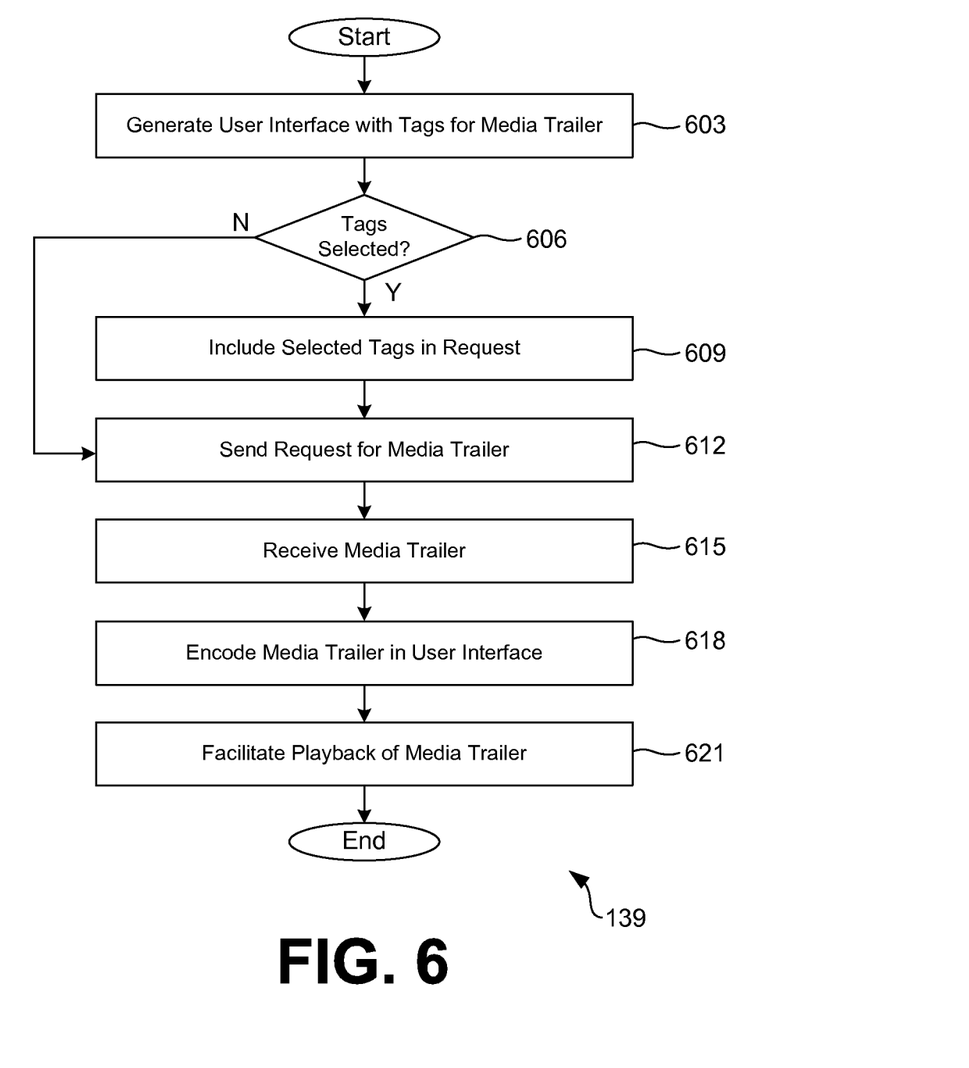
FIG. 6 is a flowchart illustrating one example of functionality implemented as portions of a client application executable in the client device of the networked environment of FIG. 1 according to various embodiments of the present disclosure.

Referring next to FIG. 6, shown is a flowchart that provides one example of the operation of a portion of the client application 139 according to various embodiments. It is understood that the flowchart of FIG. 6 provides merely an example of the many different types of functional arrangements that may be employed to implement the operation of the portion of the client application 139 as described herein. As an alternative, the flowchart of FIG. 6 may be viewed as depicting an example of elements of a method implemented in the computing environment 103 (FIGS. 1A-1B) according to one or more embodiments.

In 603, the client application 139 generates a user interface 115 for display in the client device 106. In various embodiments, the user interface 115 comprises user interface components that facilitate a selection of one or more tags 121. The tags 121 encoded in the user interface 115 may be determined by the computing environment 103, the client application 139, or predefined by an administrator. The tags 121 shown in the user interface 115 may be presented based on the media file 124 (e.g., movie) for which a media trailer 112 is being generated.

In 606, it is determined whether one or more of the tags 121 were selected in the user interface 115. If so, the process proceeds to 609 where the tags 121 selected in the user interface are included in one or more requests for a media trailer 112 to be communicated to the computing environment 103. If not, the process proceeds to 612 where the request for the media trailer 112 is sent to the computing environment 103 for access by the trailer generation application 130. As a result, the media trailer 112 is generated by the trailer generation application 130 as described above with respect to FIG. 5.

Next, in 615, the media trailer 112 is received by the client device 106 from the computing environment 103 to be accessed by the client application 139 or other application. As noted above, the media trailer 112 may be streamed to the client device 106 or the media trailer 112 may be received as one or more files. In response to receipt of the media trailer 112, the media trailer 112 may be encoded in a user interface 115, such as the user interfaces 115 of FIGS. 1 and 3. Lastly, in 621, the client application 139 is executed to facilitate playback of the media trailer 112. This may include starting playback of the media trailer 112, pausing or stopping playback of the media trailer 112, adjusting a volume level of the client device 106 for playback of the media trailer 112, etc.

Figure 7:
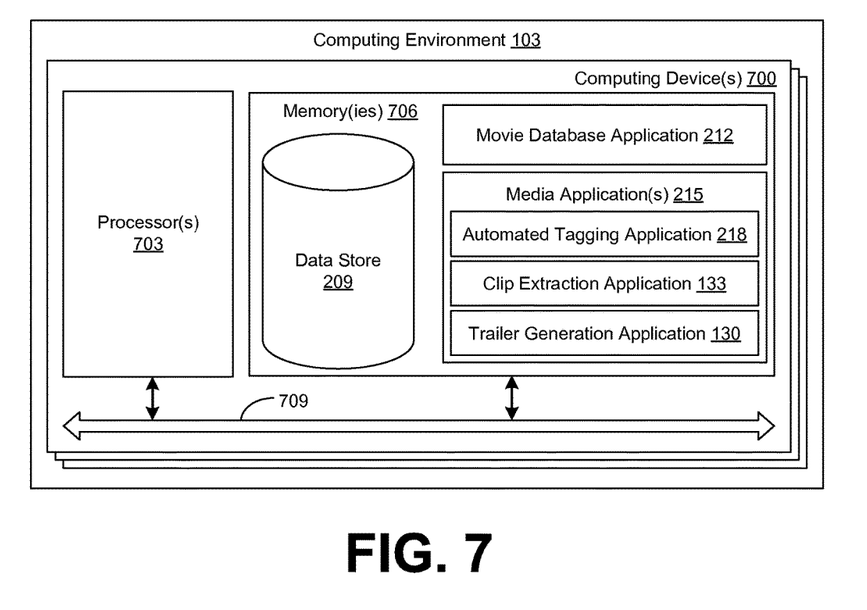
FIG. 7 is a schematic block diagram that provides one example illustration of a computing environment employed in the networked environment of FIG. 1 according to various embodiments of the present disclosure.

With reference to FIG. 7, shown is a schematic block diagram of the computing environment 103 according to an embodiment of the present disclosure. The computing environment 103 includes one or more computing devices 700. Each computing device 700 includes at least one processor circuit, for example, having a processor 703 and a memory 706, both of which are coupled to a local interface 709. To this end, each computing device 700 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the movie database application 212, the media applications (e.g., the automated tagging application 218, the clip extraction application 133, and/or the trailer generation application 130), and potentially other applications. Also stored in the memory 706 may be a data store 209 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the movie database application 212, the media applications (e.g., the automated tagging application 218, the clip extraction application 133, and/or the trailer generation application 130), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4, 5, and 6 show the functionality and operation of an implementation of portions of the automated tagging application 218, the trailer generation application 130, and the client application 139. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 4, 5, and 6 show a specific order of execution, it is understood that the order of execution may differ from that which is depicted. For example, the order of execution of two or more blocks may be scrambled relative to the order shown. Also, two or more blocks shown in succession in FIGS. 4, 5, and 6 may be executed concurrently or with partial concurrence. Further, in some embodiments, one or more of the blocks shown in FIGS. 4, 5, and 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the movie database application 212, the media applications (e.g., the automated tagging application 218, the clip extraction application 133, and/or the trailer generation application 130), that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the movie database application 212, the media applications (e.g., the automated tagging application 218, the clip extraction application 133, and/or the trailer generation application 130), may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 700, or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying program code executable in at least one computing device that, when executed, causes that least one computing device to:
   generate a plurality of tags for individual ones of a plurality of clips of a media file, individual ones of the plurality of tags being indicative of an event occurring in a corresponding one of the plurality of clips, the plurality of tags being generated by the at least one computing device based at least in part on an automated analysis of at least one of an audio component or a video component of the plurality of clips performed by the at least one computing device and vetted by a plurality of users of a network site;
   receive a request from a client device over a network to generate a media trailer for the media file, the media trailer being customized for a particular user, the request comprising a selection of at least a portion of the plurality of tags made in the client device, the client device being associated with a user account;
   extract at least a portion of the plurality of clips from the media file, the plurality of clips being associated with the plurality of tags identified in the request;
   determine an order of the plurality of clips for a playback of the media trailer;
   generate the media trailer by combining the plurality of clips extracted from the media file based at least in part on the order determined; and
   communicate the media trailer to the client device over the network for access by the particular user associated with the user account.

2. The non-transitory computer-readable medium of claim 1, wherein the order of the plurality of clips is determined pseudo-randomly.

3. The non-transitory computer-readable medium of claim 1, further comprising program code that, when executed, causes the at least one computing device to overlay the media trailer with an audio component comprising computer-generated speech or music from a soundtrack associated with the media file.

4. A system, comprising:
   at least one computing device comprising at least one hardware processor;

a data store comprising a non-transitory computer-readable medium; and program instructions stored in the data store and executable in the at least one computing device that, when executed, cause the at least one computing device to:

receive a request over a network to generate a media trailer for a list of media content having information associated with a plurality of media files, wherein the list of media content is shown in a screen of a client application for a media category being navigated by a user of a client device at an instance when the user accessed the screen of the client application, and the media trailer is generated for rendering on the client device;

generate the media trailer by combining a plurality of clips extracted from the at least one media file or a preview associated with the at least one media file; and communicate at least a portion of the media trailer to the client device over the network for access by the user in the client application.

5. The system of claim 4, further comprising program instructions that, when executed, cause the at least one computing device to:

identify that the media trailer has been selected by the user of the client device in a user interface of the client application during a playback of the media trailer;

identify a selected one of the plurality of clips being shown in the media trailer when selected by the user;

access individual ones of the plurality of media files in the list of media content for rendering in the user interface; and navigate the user interface to a portion of the list of media content associated with a media title corresponding to the selected one of the plurality of clips.

6. The system of claim 5, wherein the request comprises a selection of at least one of a plurality of tags indicative of a potential event occurring in a playback of the media file.

7. The system of claim 4, wherein the list of media content further comprises a watch list generated by the user having a plurality of media titles specified by the user as being of interest to the user.

8. The system of claim 4, further comprising program instructions that, when executed, cause the at least one computing device to extract the plurality of clips from the media file or the preview associated with the media file based at least in part on the plurality of media files in the list of media content.

9. The system of claim 4, further comprising program instructions that, when executed, cause the at least one computing device to determine an order of the plurality of clips for a playback of the media trailer, the media trailer being generated based at least in part on the order.

10. The system of claim 9, wherein the order of the plurality of clips is determined pseudo-randomly.

11. The system of claim 9, wherein the order of the plurality of clips is determined according to a predefined template.

12. The system of claim 4, further comprising program instructions that, when executed, cause the at least one computing device to overlay the media trailer with an audio component comprising at least one of computer-generated speech or music from a soundtrack associated with the media file.

13. A computer-implemented method, comprising:

receiving, by at least one computing device, a request from a client device associated with a user account over a network to generate a media trailer in association with a media file, the request comprising at least a selection of at least one of a plurality of tags indicative of a potential event occurring in a playback of the media file, the at least one computing device comprising memory and at least one hardware processor, the tags being vetted by a plurality of users of at least one network site;

extracting, by the at least one computing device, a plurality of clips from the media file or a preview associated with the media file based at least in part on the at least one of the plurality of tags identified in the request, wherein the plurality of clips are associated with the at least one of the plurality of tags identified in the request;

generating, by the at least one computing device, the media trailer by combining the plurality of clips extracted from the media file or a preview associated with the media file; and communicating, by the at least one computing device, at least a portion of the media trailer to the client device over the network for access by at least one user associated with the user account.

14. The method of claim 13, further comprising automatically generating, by the at least one computing device, the plurality of tags for individual ones of the plurality of clips of the media file based at least in part on an analysis of an audio component or a video component of the media file.

15. The method of claim 14 wherein the plurality of tags are automatically generated by comparing, by the at least one computing device, a segment of the audio component or the video component to a digital fingerprint.

16. The method of claim 15, further comprising vetting, by the at least one computing device, the plurality of tags automatically generated by presenting the plurality of tags on the at least one network site, wherein the at least one network site comprises a component configured to receive user input indicating an accuracy of the plurality of tags.

17. The method of claim 13, wherein the plurality of tags are generated by the plurality of users of the at least one network site.

18. The method of claim 13, further comprising determining, by the at least one computing device, an order of the plurality of clips for a playback of the media trailer, the media trailer being generated based at least in part on the order.

19. The method of claim 13, further comprising automatically generating, by the at least one computing device, at least one of the plurality of tags for individual ones of the plurality of clips of the media file based at least in part on an analysis of at least one face detected in a video component of the plurality of clips.

20. The method of claim 19, wherein the plurality of tags generated based at least in part on the analysis of the at least one face correspond to a character detected in the video component of the plurality of clips.

* * * * *